Figure 1:
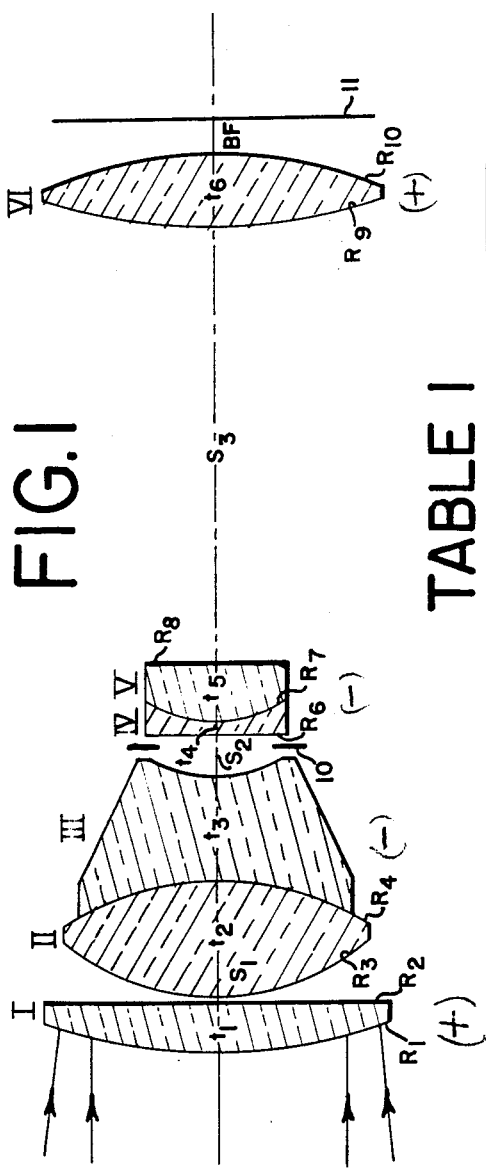

July 24, 1962

J. G. BAKER 3,045,549

TELEPHOTO OPTICAL DESIGN

Filed April 10, 1959

TABLE I

| f=1.000 | | | | |
|---|---|---|---|---|
| LENS | RADII | THICKNESSES | $n_D$ | V |
| I | $R_1$ = 0.488<br>$R_2$ = PLANO | $t_1$ = 0.0374<br>$S_1$ = 0.0032 | 1.613 | 58.6 |
| II | $R_3$ = 0.200<br>$R_4$ = -0.254 | $t_2$ = 0.0933<br>$t_3$ = 0.0974 | 1.613<br>1.617 | 58.6<br>36.6 |
| III | $R_5$ = 0.105<br>$R_6$ = -0.936 | $S_2$ = 0.0304<br>$t_4$ = 0.0122 | | |
| IV<br>V | $R_7$ = 0.105<br>$R_8$ = 0.936 | $t_5$ = 0.0478<br>$S_3$ = 0.369 | 1.613<br>1.596 | 58.6<br>39.2 |
| VI | $R_9$ = 0.468<br>$R_{10}$ = -0.359 | $t_6$ = 0.058<br>BF = 0.0300 | 1.617 | 36.6 |

INVENTOR.
JAMES G. BAKER
BY
ATTORNEYS

United States Patent Office 3,045,549
Patented July 24, 1962

3,045,549
TELEPHOTO OPTICAL DESIGN
James G. Baker, Winchester, Mass., assignor to the United States of America as represented by the Secretary of the Air Force
Filed Apr. 10, 1959, Ser. No. 805,643
1 Claim. (Cl. 88—57)

This invention relates to telephoto lenses and more particularly to that type corrected for spherical aberration, coma, astigmatism, curvature of field, and distortion, as well as the chromatic aberrations of lateral and longitudinal color, and certain higher order variations of the above mentioned aberrations, being distinguished by a four component construction, two forward of the stop and two behind the stop. In this construction the rays for infinite conjugate object plane are always converging through the entire system. In ordinary telephoto lenses this continuous convergence is usually true but the circumstance leads to distortion of the chief rays except for special constructions in the prior art designed to reduce or eliminate the condition. In the invention claimed herein a novel construction has been found that not only minimizes distortion but also permits a considerable reduction of the physical length of the optical system relative to the focal length without sacrificing other essential characteristics of performance.

Telephotos of the prior art commonly have a front positive group and a rear divergent group with respect to a centrally located stop. Achromatization of the two groups usually leads to strongly curved surfaces which in turn either cause unacceptable aberrations or require that the $f$ number of the telephoto be limited. For example, a normal telephoto lens covering a total field of 15 degrees might have a lens speed of $f/5.0$ to $f/8.0$, except for those of unusually short focal length, where lens speeds of $f/4.5$ occasionally have been obtained. If the angular field is increased, the $f$ number as a rule also increases. Thus, a telephoto lens covering a 30-degree field might have a speed of only $f/8$, although occasionally one at $f/6.3$ might be found.

Accordingly, it is an object of the invention to provide an improved telephoto lens system which has a successful aspheric lens which can be incorporated in an aerial camera.

Another object of the invention is to provide a telephoto lens system which is substantially corrected for spherical aberration, coma, astigmatism, curvature of field, and distortion as well as the chromatic aberrations of lateral and longitudinal color and certain higher order variations of these aberrations.

Still another object of the invention is to provide a telephoto lens system which is unusually compact and especially suited for aerial photographic reconnaissance operations.

Symbols in the field in which this invention occurs are well established and Roman numerals I, II, etc. beginning with oncoming light indicate lens elements. Arrows indicate light energy paths. Lens surface radii of curvature are indicated by the letter R. Lens radii of curvature are positive for lens surfaces which are convex to oncoming light and are negative for lens surfaces which are concave to oncoming light. The letter $t$ indicates the axial thicknesses of lenses. The letter S indicates the axial air spaces between lens element surfaces. $n_D$ is the refractive index for the sodium light D line of the spectrum of lambda 5893A°. V is the reciprocal dispersive power or Abbe number. The lens system described herein may be constructed from commercially available glass types.

The telephoto lens described herein is especially suited to medium to small angular fields but can be designed to have lens speeds of the order of $f/4.0$ for systems of great focal length to $f/3.0$ for those with short focal length. This novel optical system is also characterized by little or no vignetting at the edge of the adopted field, a circumstance made possible by the unusual construction which produces a sharp image at the edge of the field. The limiting aberration is high order astigmatism that sets in very rapidly to limit the field, but which in turn causes no trouble in the quality of the image for medium to small field angles. Oblique spherical aberration has been eliminated by choice of glass types and cemented surfaces and by the most favorable values of the curvatures and separations. Coma and oblique coma are both quite highly corrected, the residuals in the image plane for long focal lengths being not larger than a few microns. In errors of the aperture the limiting aberration turns out to be chromatic variations in the oblique spherical and oblique coma, which however, do not reach serious proportions until either the higher order astigmatism has limited the off-axis angle or until the spectral range is increased into the deep violet or deep red.

For a better understanding of the invention reference may be made to the accompanying drawing in which there is shown a telephoto lens according to the invention wherein:

FIG. 1 is a form of $f/4.5$ telephoto lens system covering a 16° total field; and Table 1 includes the numerical data of the lens system shown in FIG. 1.

In the drawings the light energy enters the lens system as indicated by the directional arrows shown. Consecutively numbered subscripts are in the order of the passage of light energy through the system. The lens elements are indicated by Roman numerals. The lens surface curvatures are of radii indicated by the letter R, with the radii positive where the lens surface is convex to approaching light and with the radii negative when the lens surface is concave to approaching light. The lens axial thicknesses are indicated by the letter $t$ and the axial air spaces between adjacent lens surfaces are indicated by the letter S. The systems include a stop 10 and a focal plane 11.

Referring now to FIG. 1, a chart of values for the components of the lens system shown therein follows: Optical design of a form of $f/4.5$ telephoto for a 16° total field in terms of the focal length taken as unity.

[$f$=1.000, mean color 5461, spectral coverage 4341 to 6700 approx.]

| Lens | $n_D$ | V | Radii | Thicknesses |
|---|---|---|---|---|
| I | 1.613 | 58.6 | $R_1$ =0.488 | $t_1$=0.0374 |
|   |       |      | $R_2$ =plano | $S_1$=0.0032 |
| II | 1.613 | 58.6 | $R_3$ =0.200 | $t_2$=0.0933 |
| III | 1.617 | 36.6 | $R_4$ =−0.254 | $t_3$=0.0974 |
|   |       |      | $R_5$ =0.105 | $S_2$=0.0304 |
| IV | 1.613 | 58.6 | $R_6$ =−0.936 | $t_4$=0.0122 |
| V | 1.596 | 39.2 | $R_7$ =0.105 | $t_5$=0.0478 |
|   |       |      | $R_8$ =0.936 | $S_3$=0.369 |
| VI | 1.617 | 36.6 | $R_9$ =0.468 | $t_6$=0.058 |
|   |       |      | $R_{10}$=−0.359 | BF=0.0360 |

The stop lies 0.021 from the vertex of $R_5$.

In the above chart, conversion to inches for a $f$=18 lens is accomplished by multiplying R values by 18 (focal length) as for example $R_1$, $0.488 \times 18 = 8.78$ inches, $R_3$, $0.200 \times 18 = 3.60$ inches, etc.

In the lens system shown in FIG. 1, for a focal length of 18 inches the stop 10 lies 0.377 inch from the vertex of $R_5$ and has a clear aperture at $f/4.5$ of 1.761 inches.

The optical system according to the invention comprises as its first component a collective member I, which preferably is a simple element.

The second component of the system, consists of two elements. This component is of meniscus form and, neglecting the great thickness, is of negative effect in the system. One can describe this thick component as being a negative meniscus component whose air surface on the long conjugate side is convex and whose air surface on the short conjugate side, adjacent to the stop, is strongly concave. The color correction of the system requires that at least two elements be used.

A diaphragm stop 10 is interposed between the second and third components.

The third component of the system follows the stop 10 and consists of two elements. Its function is primarily to spread out some of the negative telephoto power that otherwise might be added to the surface immediately preceding the stop on the long conjugate side, which would in that event render almost hopeless any attempt to control the aberrations. Another of its functions is to have added negative power to produce an enhanced telephoto effect without serious increase in aberrations, the off-setting positive power being added to the fourth component described below. In addition this third component helps effect correction of the lateral and longitudinal color, while at the same time a judicious choice of the glass types and associated cemented surfaces will control oblique coma and oblique spherical aberration.

This third component lies so low in relative height that its diameter remains small. When strong cemented surfaces are used to control the oblique correction of the upper rays, care must be taken in the choice of the V-value of the glass types on either side of the strong refraction.

The fourth component lies in the neighborhood of the focal surface. It is of positive power and of bi-convex form insofar as its air surfaces are concerned and functions to produce a small or zero Petzval sum for the overall system, without at the same time destroying the telephoto effect already achieved in the first three components described above. The shape and location of this component also help correct astigmatism and distortion, and lateral color. From another point of view the fourth component comes into existence by the addition of extra negative power to the second and third components, which negative power enhances the telephoto effect, which negative power is thus off-set by the positive power of the fourth component. The location of the fourth component then serves mostly to flatten the field. The bending serves to reduce distortion and to eliminate astigmatism.

It is desirable to have at least one aspheric surface in the system. While in general it would be desirable to have the aspheric correction distributed in a certain way between the two air surfaces adjacent to the stop on either side of the stop, practicality requires at least one solution where the aspheric is on one or the other of these two surfaces. In FIG. 1 showing a form of $f/4.5$ telephoto, the aspheric correction is on the surface immediately following the stop, lying then on the short conjugate side of the stop.

Still other aspherics can be used to advantage within the concept of this invention. In the system shown in FIG. 1 it has proved desirable to have an aspheric correction added to the back side of the first component, this correction being of "turned-down" nature to off-set the cemented surface in the second component. In still another form, an aspheric can be profitably added to the rear air surface of the third component, either to improve other corrections or to serve to eliminate one or more elements otherwise required in the third component for correction of the upper oblique rays.

The rear surface of the fourth component which is then adjacent to the focal plane 11 effects correction for distortion, which comes about from the refraction of the chief rays. This refraction is accompanied by spherical aberration of the chief rays, which therefore is a distortion of higher order. The fifth order distortion is therefore of barrel nature, and the off-setting third order distortion is of pincushion nature. The two can be brought exactly into balance at a designated field angle. The inner and outer residuals thereafter depend on the adopted field angle and the focal length, if measured in linear displacement on the focal plane. It is obvious that an aspheric surface or surfaces on the fourth component can be employed to eliminate even the higher order distortions, if necessary, or more important, to improve the correction for higher order astigmatism and thereby to extend the usable field. Higher order chromatic variation of the chief ray refraction can also be troublesome. The elimination of this aberration depends on zonal achromatization of the fourth component which may be a flint and crown doublet, cemented together, if desired.

The system as a whole must be designed for color balance over field and aperture. Both may be achieved to the highest state of correction components, and by the use of aspheric by the adoption of proper surfaces as disclosed herein. Systems so designed provide speeds as fast as $f/3$ for field angles of about 15 degrees with satisfactory performances from violet to deep red, in spite of the asymmetry of construction and telephoto effect.

The telephotos disclosed herein have a strong secondary spectrum which may be minimized at any assigned wave length. The rays for colors on either side of the adopted mean color in the system focus longer and longer the farther removed the color is from the mean. This secondary spectrum exists both in the longitudinal and in the lateral color.

Calculations show that the longitudinal state of correction is very nearly constant over the field, at least in the skew or oblique direction. The tangential performance shows sensitivity to chromatic coma for those combinations which have unfavorable dispersions at cemented surfaces. On the other hand, the lateral color varies over the field; that is, the wave length of maximum distance of the chief ray from the center of the field varies with the field angle.

In the inner field the mean wave length is in the violet. In the outermost field the mean wave length has moved into the red. At a chosen field angle, such as 87% of the maximum off-axis field angle, the mean wave length lies in the blue-green, for a system balanced for this color. The rate of variation depends largely on the construction of the fourth component VI. In the simpler systems the fourth component may consist of only one element. If this element VI in FIG. 1 is made of dense flint glass to reduce the curvatures elsewhere in the system, there is marked variation of chief ray refraction with color over the field. If the fourth element is made of barium crown glass, and other chromatic curves are modified, the residuals from the lateral color variation become reduced.

The first component I may be achromatized, as being made of two or more elements of crown and flint glass corrected for chromatic aberration, if preferred, for reducing the difficulties of achromatizing the lateral color. A cemented doublet of crown and flint glass (not shown), also may replace the fourth component for the reduction and the elimination of the higher order tendency toward undercorrected astigmatism. Aspherizing the last surface of the fourth component eliminates this astigmatism. A steep cemented curve turned away from the stop 10 in one type and turned toward the stop 10 in the preferred form of doublet, with a slight index difference in the sense of the positive element lower than the adjacent negative element index, are within the concept of this invention. Choice of dispersions completely eliminate the chromatic spherical aberration of the chief rays caused by the rear surface chromatic refraction to negligible residuals. With the rear component fully achromatized, the lateral color is reduced to a stable secondary spectrum effect where the mean wave length remains about fixed in the spectrum as the field angle varies. The amplitude of the secondary spectrum increases with the field angle.

In the lens system shown in FIG. 1, the surfaces $R_2$ and $R_5$ are aspheric surfaces with edges that are turned down and turned up, respectively.

The performance of the optical system shown in FIG. 1 displays some inward coma of unobjectionably small magnitude. The color correction is slightly toward the blue. Lateral color is adequately small. The main core of the image is clear and sharp with unobjectionably small chromatic coma resulting from the strong cemented surfaces. The field is sufficiently flat for all practical purposes of the present invention.

It is obvious that the focal lengths of the telephoto lens systems described herein may be scaled to larger and to smaller focal lengths with little or no revision. The optical performance of the shorter focal lengths is even better than the optical performance of the longer focal length. For focal lengths of 6 to 8 inches, the field covered is comparable to that of miniature photography, to which the telephoto construction is readily adapted. The image quality conforms fully to all that is expected of a lens for miniature cameras, and hence fills a need for the telephoto attachment to such cameras in the 6 to 12 inch focal length range at speeds from $f/3.0$ to $f/5.0$. Other telephoto lenses of simple design serve thereafter for still greater focal lengths.

Having thus described my invention, what I claim as new and desire to secure by Letters Patent of the United States is:

A telephoto lens system comprising a plurality of axially aligned components having numerical data substantially as follows:

[$f=1.000$]

| Lens | $n_D$ | V | Radii | Thicknesses |
|---|---|---|---|---|
| I | 1.613 | 58.6 | $R_1 = 0.488$ | $t_1 = 0.0374$ |
|   |       |      | $R_2 =$ plano | $S_1 = 0.0032$ |
| II | 1.613 | 58.6 | $R_3 = 0.200$ | $t_2 = 0.0933$ |
| III | 1.617 | 36.6 | $R_4 = -0.254$ | $t_3 = 0.0974$ |
|   |       |      | $R_5 = 0.105$ | $S_2 = 0.0304$ |
|   |       |      | $R_6 = -0.936$ |   |
| IV | 1.613 | 58.6 | $R_7 = 0.105$ | $t_4 = 0.0122$ |
| V | 1.596 | 39.2 | $R_8 = 0.936$ | $t_5 = 0.0478$ |
|   |       |      |   | $S_3 = 0.369$ |
|   |       |      | $R_9 = 0.468$ |   |
| VI | 1.617 | 36.6 | $R_{10} = -0.359$ | $t_6 = 0.058$ |
|   |       |      |   | BF $= 0.0300$ | in which $R_1$, $R_2$ . . . indicate the radii of the individual surfaces starting from the front, $t_1$, $t_2$ . . . indicate the actual thicknesses of the individual elements, and $S_1$, $S_2$ . . . indicate the axial lengths of air spaces between the components, BF being the back focal distance.

References Cited in the file of this patent

UNITED STATES PATENTS

| | | |
|---|---|---|
| 2,171,274 | Merte | Aug. 29, 1939 |
| 2,332,930 | Rinia | Oct. 26, 1943 |
| 2,452,909 | Cox | Nov. 2, 1948 |
| 2,479,907 | Cox | Aug. 23, 1949 |
| 2,629,285 | Baker | Feb. 24, 1953 |
| 2,660,093 | Bertele | Nov. 24, 1953 |
| 2,671,380 | Baker | Mar. 9, 1954 |
| 2,685,230 | Baker | Aug. 3, 1954 |
| 2,721,501 | Bertele | Oct. 25, 1955 |
| 2,821,113 | Baker | Jan. 28, 1958 |
| 2,897,723 | Berger et al. | Aug. 4, 1959 |
| 2,978,957 | Becker et al. | Apr. 11, 1961 |

FOREIGN PATENTS

| | | |
|---|---|---|
| 763,502 | Great Britain | Dec. 12, 1956 |